(12) United States Patent
Black

(10) Patent No.: US 9,227,549 B2
(45) Date of Patent: Jan. 5, 2016

(54) LOCK ASSEMBLY

(71) Applicant: Rodger Black, Perry, MI (US)

(72) Inventor: Rodger Black, Perry, MI (US)

( * ) Notice: Subject to any disclaimer, the term of this patent is extended or adjusted under 35 U.S.C. 154(b) by 58 days.

(21) Appl. No.: 14/267,009

(22) Filed: May 1, 2014

(65) Prior Publication Data

US 2015/0314721 A1 Nov. 5, 2015

(51) Int. Cl.
*B60P 7/08* (2006.01)
*B60P 3/079* (2006.01)

(52) U.S. Cl.
CPC ............... *B60P 7/0823* (2013.01); *B60P 3/079* (2013.01)

(58) Field of Classification Search
CPC ............ Y10T 24/1418; Y10T 24/2177; Y10T 24/2143; Y10T 24/2175; Y10T 292/0917; Y10T 70/40; Y10T 70/411; Y10T 70/50; Y10T 70/5022; B60P 7/0838; B60P 3/079; E05B 73/0005; F16B 21/12; F16G 15/00
USPC .............. 24/270, 68 CT, 68 CD, 69 TT, 71 R
See application file for complete search history.

(56) References Cited

U.S. PATENT DOCUMENTS

| 2,051,690 | A | * | 8/1936 | Ehlin | B60C 27/10 24/69 TT |
| 2,604,678 | A | * | 7/1952 | Mayes | F16G 15/00 24/598.1 |
| 2,605,529 | A | * | 8/1952 | Gray | B60P 7/0815 24/116 R |
| 2,630,609 | A | * | 3/1953 | Le Bus | F16G 15/00 24/68 CT |
| 2,746,108 | A | * | 5/1956 | Cole | B60P 7/0838 24/68 CT |
| 3,050,800 | A | * | 8/1962 | Kernahan | F16G 15/00 114/252 |
| 3,149,821 | A | * | 9/1964 | Wallace | B60P 3/073 24/270 |
| 3,316,602 | A | * | 5/1967 | McEachern | B60P 3/41 24/273 |
| 3,418,008 | A |   | 12/1968 | Durbin | |
| 3,901,024 | A | * | 8/1975 | Ratcliff | F16G 17/00 59/93 |
| 3,974,668 | A |   | 8/1976 | McWhorter | |
| 3,988,005 | A | * | 10/1976 | Mooney | F16G 15/00 24/68 CD |
| 4,683,728 | A | * | 8/1987 | Hailey | E05B 3/0005 70/14 |
| 4,756,181 | A | * | 7/1988 | Appelgren | B25B 25/00 254/120 |
| D309,854 | S |   | 8/1990 | Smith | |
| 5,775,673 | A | * | 7/1998 | Carnes, Sr. | B25B 25/00 254/120 |
| 6,477,747 | B1 |   | 11/2002 | Flagg | |
| 7,913,363 | B2 |   | 3/2011 | Scott | |
| 2004/0064921 | A1 |   | 4/2004 | Mittleider | |

FOREIGN PATENT DOCUMENTS

WO WO2007041752 4/2007

* cited by examiner

*Primary Examiner* — Robert J Sandy
*Assistant Examiner* — David Upchurch

(57) ABSTRACT

A lock assembly for retaining a chain binder handle in a locked position includes a grip that has a first end and a second end. The second end of the grip insertably receives the chain binder handle. The first end of the grip curves toward the second end of the grip. A groove is defined between the first end of the grip and a body of the grip. A chain of the chain binder is positionable within the groove. A ring is operationally coupled to the grip. The ring is resiliently positionable over the chain after the chain is positioned within the groove. The chain is retained in the groove. The chain binder handle is retained in the locked position when the chain is positioned within the groove.

14 Claims, 3 Drawing Sheets

LOCK ASSEMBLY

BACKGROUND OF THE DISCLOSURE

Field of the Disclosure

The disclosure relates to lock devices and more particularly pertains to a new lock device for retaining a chain binder handle in a locked position.

SUMMARY OF THE DISCLOSURE

An embodiment of the disclosure meets the needs presented above by generally comprising a grip that has a first end and a second end. The second end of the grip insertably receives the chain binder handle. The first end of the grip curves toward the second end of the grip. A groove is defined between the first end of the grip and a body of the grip. A chain of the chain binder is positionable within the groove. A ring is operationally coupled to the grip. The ring is resiliently positionable over the chain after the chain is positioned within the groove. The chain is retained in the groove. The chain binder handle is retained in the locked position when the chain is positioned within the groove.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
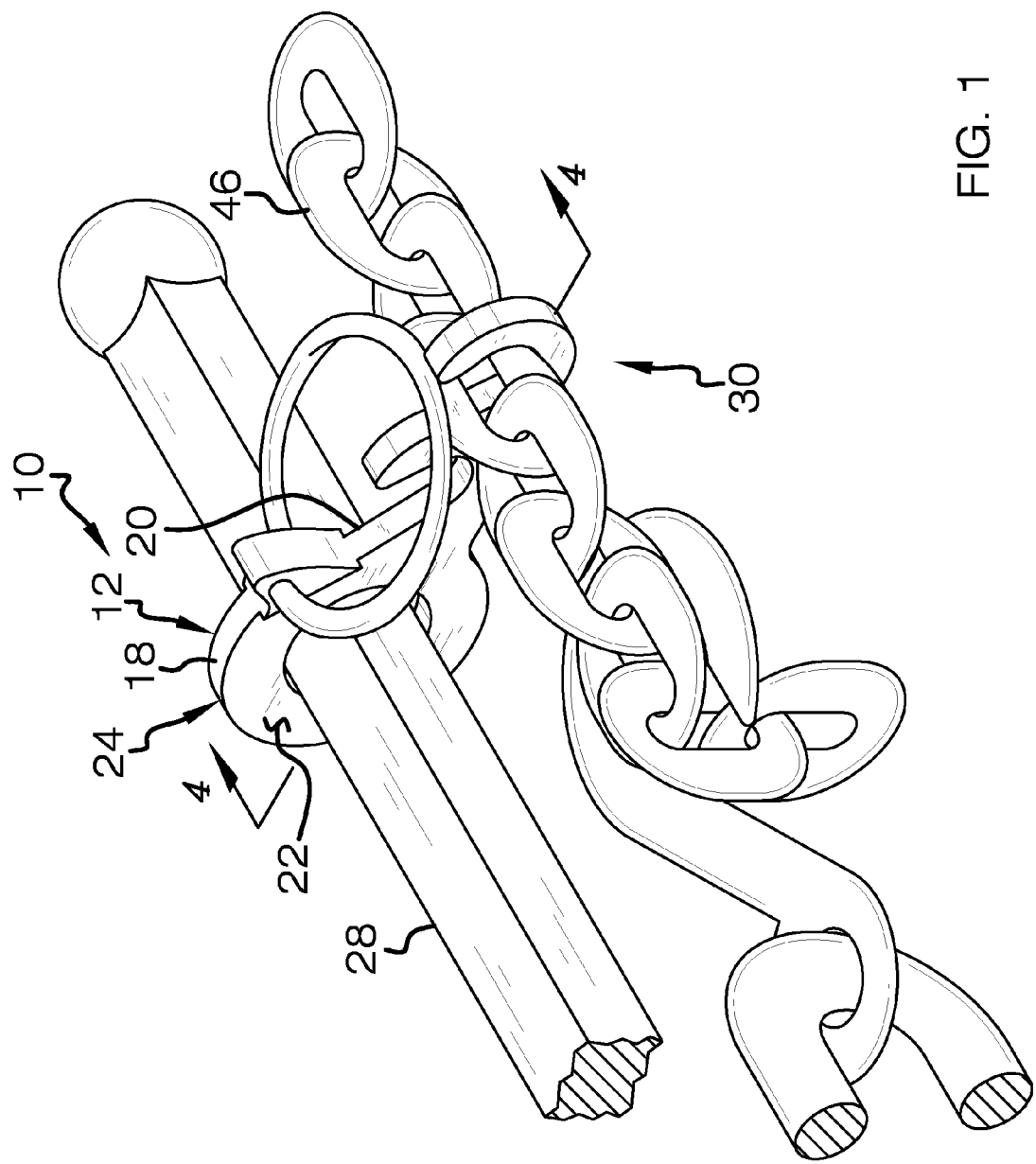
FIG. 1 is an in-use view of a lock assembly according to an embodiment of the disclosure.
Figure 2:
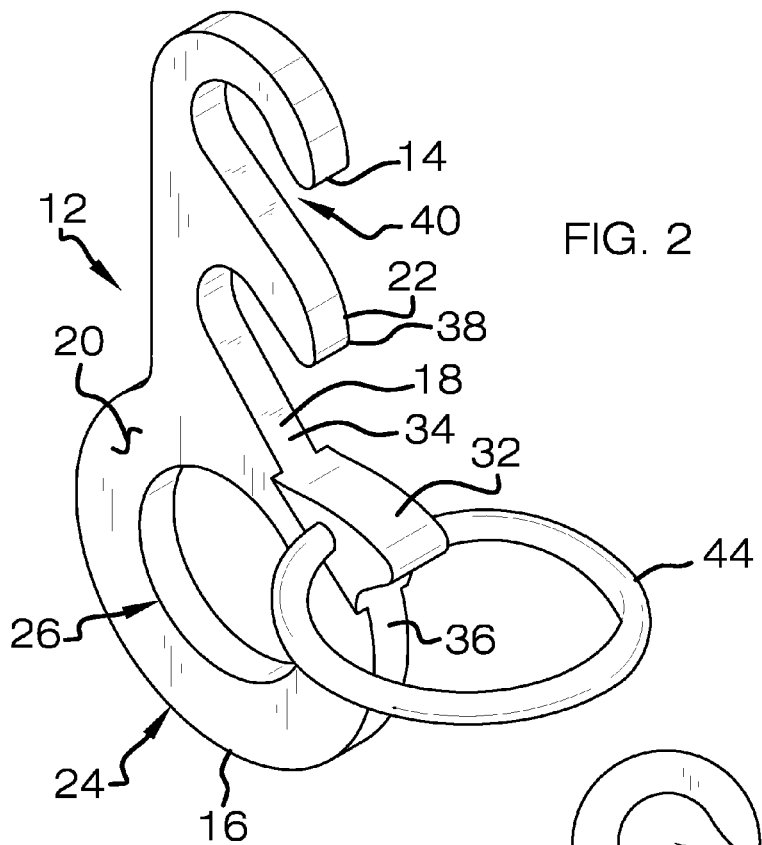
FIG. 2 is a perspective view of an embodiment of the disclosure.
Figure 3:
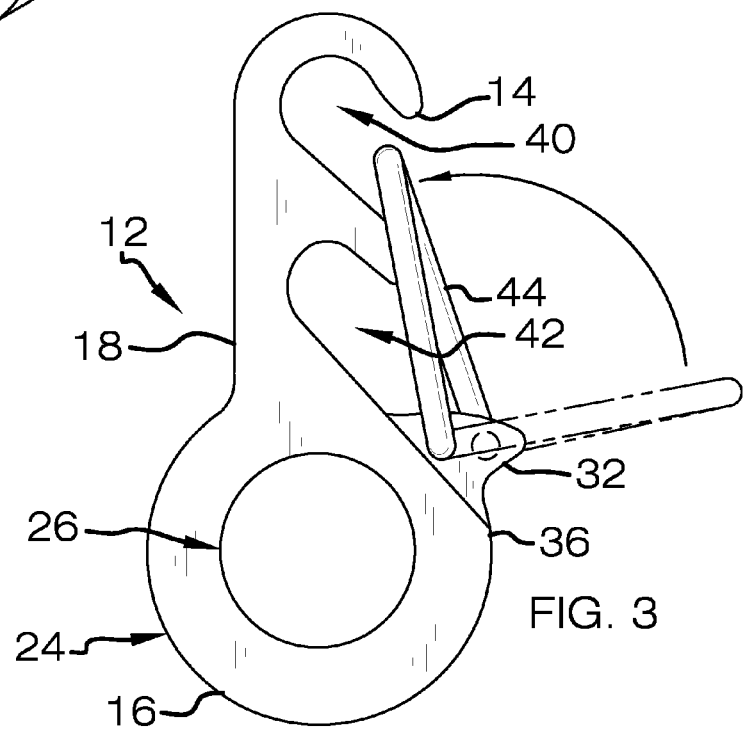
FIG. 3 is a left side view of an embodiment of the disclosure.
Figure 4:
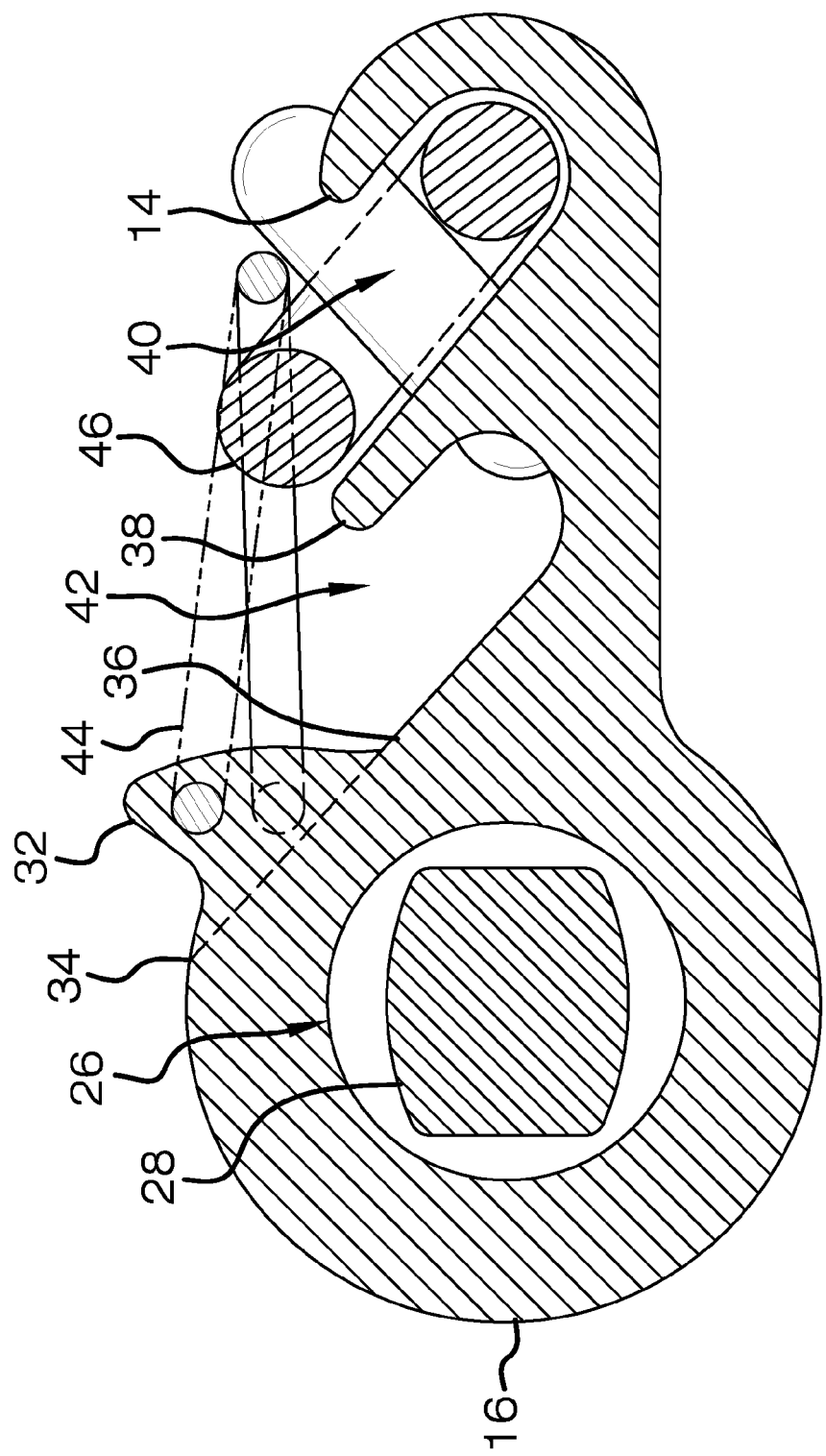
FIG. 4 is a cross sectional view taken along line 4-4 of FIG. 1 of an embodiment of the disclosure.

With reference now to the drawings, and in particular to FIGS. 1 through 4 thereof, a new lock device embodying the principles and concepts of an embodiment of the disclosure and generally designated by the reference numeral 10 will be described.

As best illustrated in FIGS. 1 through 4, the lock assembly 10 generally comprises a grip 12. The grip 12 has a first end 14 and a second end 16. The grip 12 is elongated between the first 14 and second 16 ends. An exterior edge 18 of the grip 12 extends between a first lateral surface 20 and a second lateral surface 22 of the grip 12.

The exterior edge 18 of the grip 12 is curvilinear proximate the second end 16 of the grip 12. The exterior edge 18 of the grip 12 defines a circular portion 24 of the grip 12 proximate the second end 16 of the grip 12. The first end 14 of the grip 12 curves rearwardly toward the second end 16 of the grip 12. The first end 14 of the grip 12 defines a hook shape.

The grip 12 has an opening 26 extending through the first 20 and second 22 lateral surfaces of the grip 12. Moreover, the opening 26 is centrally positioned on the circular portion 24 of the grip 12. A handle 28 of a chain binder 30 is slidably insertable through the opening 26 so the grip 12 is removably coupled to the handle 28 of the chain binder 30. The chain binder 30 may be a chain load binder of any conventional design.

A tab 32 extends outwardly from a top side 34 of the exterior edge 18 of the grip 12. The tab 32 is positioned on a forward side 36 of the circular portion 24 of the grip 12. A finger 38 extends outwardly from the top side 34 of the exterior edge 18 of the grip 12. The finger 38 curves rearwardly toward the circular portion 24 of the grip 12. The finger 38 is centrally positioned between the first end 14 of the grip 12 and the circular portion 24 of the grip 12.

The finger 38 defines a forward groove 40 between the finger 38 and the first end 14 of the grip 12. The finger 38 additionally defines a rearward groove 42 between the finger 38 and the circular portion 24 of the grip 12. Each of the forward 40 and rearward 42 grooves angles forwardly away from the circular portion 24 of the grip 12.

A ring 44 extends through the tab 32. The ring 44 lies on a plane that is perpendicular to the first lateral surface 20 of the grip 12. The ring 44 is movably coupled to the tab 32.

The ring 44 is positionable in a closed position. The ring 44 extends forwardly toward the first end 14 of the grip 12 in the closed position. Additionally, the ring 44 is positionable in an open position. The ring 44 extends upwardly from the grip 12 in the open position. The ring 44 is biased toward the closed position.

A chain 46 of the chain binder 30 is positionable within a selected one of the forward 40 or rearward 42 grooves. The ring 44 is positionable in the closed position after the chain 46 of the chain binder 30 is positioned in a selected one of the forward 40 or rearward 42 grooves. The ring 44 retains the chain 46 within the selected forward 40 or rearward 46 grooves. Moreover, the handle 28 of the chain binder 30 is retained in a locked position when the chain 46 is positioned within the selected forward 40 or rearward 42 grooves.

In use, the chain binder 30 is utilized in the convention of chain load binders. The handle 28 on the chain binder 30 is manipulated to tighten the chain 46 on the chain binder 30. The handle 28 is positioned in the locked position so the handle 28 extends laterally along the chain 46. The grip 12 is positioned on the handle 28. The chain 46 is positioned with the selected forward 40 or rearward 42 groove so the handle 28 of the chain binder 30 is retained in the locked position. The assembly 10 is removed from the chain binder 30 when the chain binder 30 is to be loosened or removed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lock assembly configured to retain a chain binder handle in a locked position, said assembly comprising:
   a grip having a first end and a second end, said second end of said grip insertably receiving the chain binder handle;
   said first end of said grip curving toward said second end of said grip such that a groove is defined between said first end of said grip and a body of said grip, a chain of the chain binder being positionable within said groove; and
   a ring operationally coupled to said grip, said ring being resiliently positionable over the chain after the chain is positioned within said groove such that the chain is retained in said groove, the chain binder handle being retained in the locked position when the chain is positioned within said groove.

2. The assembly according to claim 1, wherein said grip being elongated between said first and second ends.

3. The assembly according to claim 1, wherein said grip having an exterior edge of said grip extending between a first lateral surface and a second lateral surface of said grip.

4. The assembly according to claim 1, an exterior edge of said grip being curvilinear proximate said second end of said grip such that said exterior edge of said grip defines circular portion of said grip proximate said second end of said grip.

5. The assembly according to claim 1, wherein said grip having an opening extending through a first lateral surface and a second lateral surface of said grip, said opening being centrally positioned on a circular portion of said grip.

6. The assembly according to claim 1, wherein the chain binder handle being slidably insertable through an opening such that said grip is removably coupled to the chain binder handle.

7. The assembly according to claim 1, wherein a tab extending outwardly from a top side of an exterior edge of said grip, said tab being positioned on a forward side of a circular portion of said grip.

8. The assembly according to claim 1, wherein a finger extending outwardly from a top side of an exterior edge of said grip, said finger curving toward a circular portion of said grip, said finger being centrally positioned between said first end of said grip and said circular portion of said grip.

9. The assembly according to claim 8, wherein said finger defining a forward groove between said finger and said first end of said grip and a rearward groove between said finger and said circular portion of said grip.

10. The assembly according to claim 1, wherein said ring extending through a tab such that said ring lies on a plane being perpendicular to a first lateral surface of said grip.

11. The assembly according to claim 1, wherein said ring being movably coupled to a tab such that said ring is positionable between a closed position having said ring extending forwardly toward said first end of said grip and an open position having said ring extending upwardly from said grip.

12. The assembly according to claim 1, wherein said ring being biased toward a closed position.

13. The assembly according to claim 1, wherein said ring being positionable in a closed position after the chain is positioned in a selected one of a forward groove or a rearward groove such that the chain is retained within the selected forward or rearward groove.

14. A lock assembly configured to retain a chain binder handle in a locked position, said assembly comprising:
   a grip having a first end and a second end, said grip being elongated between said first and second ends, said grip having an exterior edge of said grip extending between a first lateral surface and a second lateral surface of said grip, said exterior edge of said grip being curvilinear proximate said second end of said grip such that said exterior edge of said grip defines circular portion of said grip proximate said second end of said grip, said first end of said grip curving rearwardly toward said second end of said grip;
   said grip having an opening extending through said first and second lateral surfaces of said grip, said opening being centrally positioned on said circular portion of said grip, the chain binder handle being slidably insertable through said opening such that said grip is removably coupled to the chain binder handle;
   a tab extending outwardly from a top side of said exterior edge of said grip, said tab being positioned on a forward side of a circular portion of said grip;
   a finger extending outwardly from said top side of said exterior edge of said grip, said finger curving rearwardly toward said circular portion of said grip, said finger being centrally positioned between said first end of said grip and said circular portion of said grip;
   said finger defining a forward groove between said finger and said first end of said grip and a rearward groove between said finger and said circular portion of said grip;
   a ring extending through said tab such that said ring lies on a plane being perpendicular to said first lateral surface of said grip, said ring being movably coupled to said tab such that said ring is positionable between a closed position having said ring extending forwardly toward said first end of said grip and an open position having said ring extending upwardly from said grip;
   said ring being biased toward said closed position; and
   said ring being positionable in said closed position after a chain of the chain binder is positioned in a selected one of said forward or rearward grooves such that the chain is retained within the selected forward or rearward groove, the chain binder handle being retained in the locked position when the chain is positioned within said groove.

* * * * *